(12) United States Patent
Graff (10) Patent No.: US 10,067,625 B2
(45) Date of Patent: Sep. 4, 2018

(54) VIRTUAL DEFLECTION DETERMINATION FOR FORCE-SENSING

(71) Applicant: Apple Inc., Cupertino, CA (US)

(72) Inventor: David Steven Graff, San Jose, CA (US)

(73) Assignee: Apple Inc., Cupertino, CA (US)

( * ) Notice: Subject to any disclaimer, the term of this patent is extended or adjusted under 35 U.S.C. 154(b) by 49 days.

(21) Appl. No.: 15/461,110

(22) Filed: Mar. 16, 2017

(65) Prior Publication Data

US 2017/0269734 A1    Sep. 21, 2017

Related U.S. Application Data

(60) Provisional application No. 62/310,092, filed on Mar. 18, 2016.

(51) Int. Cl.
*G06F 3/044*       (2006.01)

(52) U.S. Cl.
CPC .... *G06F 3/044* (2013.01); *G06F 2203/04105* (2013.01)

(58) Field of Classification Search
None
See application file for complete search history.

(56) References Cited

U.S. PATENT DOCUMENTS

| | | | | |
|---|---|---|---|---|
| 6,333,736 | B1* | 12/2001 | Sandbach | G06F 3/0414 178/18.03 |
| 2002/0163509 | A1* | 11/2002 | Roberts | G06F 3/0414 345/173 |
| 2007/0085838 | A1* | 4/2007 | Ricks | G06F 3/0412 345/173 |
| 2008/0303802 | A1* | 12/2008 | Destura | G02F 1/13338 345/175 |
| 2010/0253651 | A1* | 10/2010 | Day | G06F 3/044 345/175 |
| 2014/0043289 | A1* | 2/2014 | Stern | G06F 3/044 345/174 |
| 2014/0139328 | A1* | 5/2014 | Zellers | G06F 3/016 340/407.2 |
| 2015/0296062 | A1* | 10/2015 | Lee | G02F 1/133345 455/566 |
| 2015/0363019 | A1* | 12/2015 | Schediwy | G06F 3/044 345/174 |

* cited by examiner

*Primary Examiner* — Nicholas Lee
(74) *Attorney, Agent, or Firm* — DLA Piper LLP US; Kristoffer W. Lange (57) ABSTRACT

A force applied to a force-sensing touch screen device may be determined as follows. A deformation sensing layer of the device may measure an actual deformation of a touch screen of the device. A force sensor of the device may measure a sensed force applied by the touch screen to the force sensor of the device. A processor circuit of the device may determine an expected deformation expected to be imparted to the touch screen by the sensed force. The processor circuit may determine a virtual deformation based on the expected deformation due to the sensed force and the measured actual deformation. The virtual deformation may indicate the force applied to the force-sensing touch screen.

23 Claims, 7 Drawing Sheets

VIRTUAL DEFLECTION DETERMINATION FOR FORCE-SENSING

CROSS-REFERENCE TO RELATED APPLICATION

This application claims priority to and the benefit of U.S. Provisional Patent Application No. 62/310,092, filed on Mar. 18, 2016, the disclosure of which is incorporated herein by reference in its entirety.

FIELD OF THE INVENTION

The present disclosure relates generally to detecting force in a touch-screen device.

BACKGROUND

Many types of input devices may be used to provide input to computing devices, such as buttons or keys, mice, trackballs, joysticks, touch screens and the like. Touch screens, in particular, are becoming increasingly popular because of their ease and versatility of operation. Typically touch screens can include a touch sensor panel, which may be a clear panel with a touch-sensitive surface, and a display device that can be positioned behind the panel so that the touch-sensitive surface substantially covers the viewable area of the display device. Touch screens allow a user to provide various types of input to the computing device by touching the touch sensor panel using a finger, stylus, or other object at a location dictated by a user interface being displayed by the display device. In general, touch screens can recognize a touch event and the position of the touch event on the touch sensor panel, and the computing system can then interpret the touch event in accordance with the display appearing at the time of the touch event, and thereafter can perform one or more actions based on the touch event.

Touch sensor panels can be formed from a matrix of row and column traces, with sensors or pixels present where the rows and columns cross over each other while being separated by a dielectric material. Each row can be driven by a stimulation signal, and touch locations can be identified through changes in the stimulation signal. Typically, a touch location is sensed based on an interference of the stimulation signal, such that a touch location may correspond to a location where the stimulation signal is the weakest. Touch sensor panels may generally be configured to detect touches from a user's fingers, which generally have a surface area that contacts the touch sensor panel to disturb the stimulation signal sufficiently for touch location to be recognized.

Touch sensor panels may also incorporate or be co-located with force sensors. For example, an array of force sensors may be placed underneath the touch panel, or the touch panel may be constructed such that the capacitance across the panel varies in response to applied force and the capacitance is detected. Other arrangements of force sensors that translate an applied force into an electrical signal may also be used in a touch sensor panel in order to provide a force sensitive touch sensor panel. Force sensitive touch sensors may generally be configured to detect force applied by a user's fingers, which can apply sufficient force to cause the touch panel to deform. In a mobile device that has a display that is both touch sensitive and force sensitive, force applied to the display may enable additional forms of interaction with the device such as previewing content.

When a user is holding a mobile device and applying force to the device, the touch screen deforms under the force. As long as this deformation is small enough (typically, when deformation is less than the thickness of the glass screen), the deformation will be linear with respect to applied force. This linearity is relied upon in typical algorithms used to reconstruct applied forces, such as those described U.S. patent application Ser. No. 14/776,610, incorporated herein in its entirety. For example, the "generalized inverse" method of the above-mentioned patent application relies on the underlying system being linear.

However, if sufficient force is applied that the screen deforms enough to contact a portion of the force sensor, a portion of the touch screen electronics, or any other portion of the device, the contacted portion of the device will apply counter-force to the screen. This counter-force will prevent the touch screen from deforming completely, resulting in a deformation that is less than it would have been if the system were linear. As a result, the deformation will be non-linear with respect to the applied force. This may be exacerbated if the contacted portion of the device is rough or has protrusions. The non-linearity will interfere with algorithms that assume or require a linear response, such as the generalized inverse algorithm referenced above.

SUMMARY OF THE INVENTION

Embodiments of the present disclosure include a method and a system for determining a force-deformation relationship in a force-sensing touch screen device. In the method, an actual deformation of a touch screen of the device is measured and a sensed force applied by the touch screen to a force sensor of the device is measured. A deformation that would be imparted to the touch screen by the sensed force is determined, and a virtual deformation based on the deformation due to the sensed force and the measured actual deformation is determined.

In some embodiments, a method can comprise measuring an actual deformation of a touch screen of a force-sensing touch screen device by a deformation sensing system of the device, and measuring a sensed force applied by the touch screen to a residual force sensor of the device. In some embodiments, the deformation sensing layer can be an air gap or other compressible system and configured to operate as a capacitance sensor, and measuring the actual deformation can comprise measuring capacitance across the compressible deformation sensing layer. In some embodiments, measuring the actual deformation of the touch screen can comprise using localized measurement of strain. In some embodiments, the residual force sensor can further comprise a crash pad below the deformation sensing layer. In some embodiments, the method can comprise determining, by a processor circuit of the device, a deformation expected to be imparted to the touch screen by the sensed force, and determining, by the processor circuit, a virtual deformation based on the expected deformation due to the sensed force and the measured actual deformation. In some embodiments, the processor circuit can determine the expected deformation using a model of deformation based on applied force. In some embodiments, the method can further comprise subtracting the expected deformation from the measured actual deformation to determine the virtual deformation.

In some embodiments, a system can comprise a deformation sensing layer configured to measure an actual deformation of a touch screen of a force-sensing touch screen device, a residual force sensor configured to measure a sensed force applied by the touch screen to the residual force sensor of the device, and a processor circuit coupled to the deformation sensing layer and the residual force sensor. In some embodiments, the deformation sensing layer can be compressible and configured to operate as a capacitance sensor measuring capacitance across the compressible deformation sensing layer. In some embodiments, the deformation sensing layer can measure the actual deformation of the touch screen using localized measurement of strain. In some embodiments, the processor circuit can be configured to determine a deformation expected to be imparted to the touch screen by the sensed force, and to determine a virtual deformation based on the expected deformation due to the sensed force and the measured actual deformation. In some embodiments, the processor circuit can use a model of deformation based on applied force to calculate the expected deformation. In some embodiments, the processor circuit can subtract the expected deformation from the measured actual deformation to produce the virtual deformation.

Other features and advantages will become apparent from the following detailed description and drawings.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be illustrative only.

DETAILED DESCRIPTION

The present disclosure describes a touch-screen device that can provide force sensing that accommodates interference with the linear deformation of the touch screen.

Figure 1:
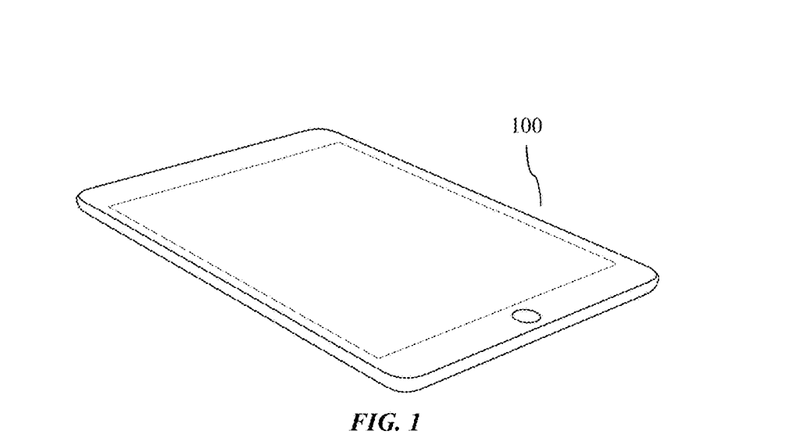
FIG. 1 shows a touch screen device in accordance with an embodiment of the present disclosure.

FIG. 1 shows an example of a touch screen device 100, such as a smartphone or tablet, as described in more detail herein. The touch screen device 100 may include one or more touch sensors and one or more force sensors.

Figure 2:
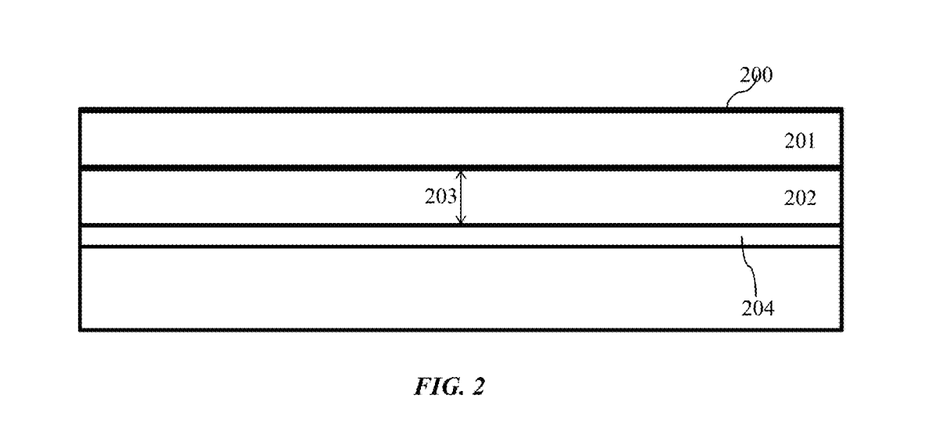
FIG. 2 shows a cross-section of a touch screen device incorporating touch sensing and deformation sensing layers (i.e., a force-sensing touch screen device.)

FIG. 2 shows an example of a cross-section of a touch screen device 200, incorporating a touch sensing display layer 201, also called a touch screen, and a deformation sensing layer 202. In some embodiments, the touch sensing display layer comprises glass. In some embodiments, deformation sensing layer 202 operates as a capacitance sensor measuring capacitance across a compressible deformation sensing layer 202. Compressible deformation sensing layer 202 may be a compressible material, or may be an air gap allowing touch sensing display layer 201 to flex and thereby reduce distance 203 across the air gap. As capacitance between two parallel surfaces is directly related to distance between the surfaces, the capacitance is thus directly related to the distance 203 across the deformation sensing layer. The device may also include a crash pad 204, which is a structural element below the deformation sensing layer 202. Crash pad 204 is designed to limit the deflection of the touch screen in order to prevent the display from contacting or crashing into vulnerable electronic or mechanical elements within the device. In some embodiments, the crash pad 204 is located to limit the maximum deflection of the touch sensing display layer 201. This limit ensures that the deflection remains linear with respect to the sum of forces applied to it (although it will still become non-linear with respect to forces applied by the user due to counter-force applied by the crash pad.) In some embodiments, the crash pad 204 may be irregular such that the top of the crash pad is not flat. The crash pad 204 may independently sense force applied to the crash pad by contact from the touch screen. The sensed force is equal to the force exerted by the crash pad on the touch screen.

Figure 3:
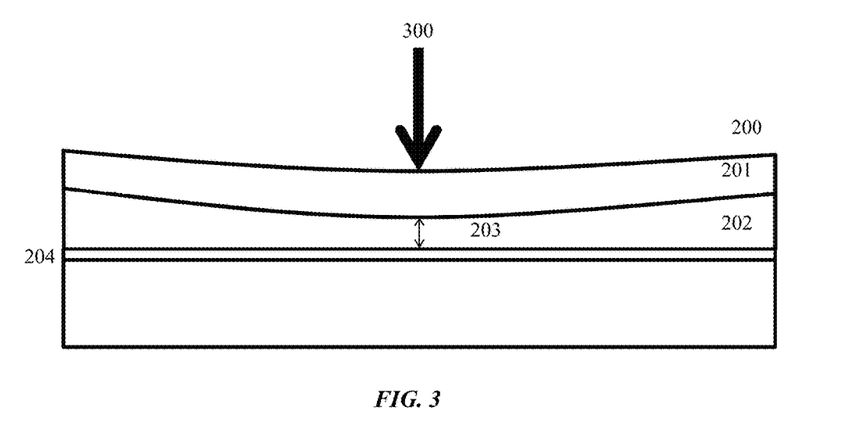
FIG. 3 shows a cross-section of a force-sensing touch screen device when force is being applied to the screen of the device.

FIG. 3 shows an example of a cross-section of touch screen device 200 when a force 300 is applied to the touch sensing display layer 201 (i.e., the top or front of the device 200). As force 300 is applied to the top of the device, the touch sensing display layer 201 is deformed underneath the point at which the force is applied. This deformation applies a force to deformation sensing layer 202. In embodiments in which deformation sensing layer 202 operates by sensing capacitance across the compressible deformation sensing layer 202, the deformation compresses the layer, thereby reducing the distance 203 between the top and bottom of the layer. In these embodiments, this reduction in distance 203 results in increased capacitance, which the deformation sensing layer 202 measures. The measured amount of capacitance can then be mapped to an amount of force applied. By incorporating localized measurements of capacitance, a location of the applied force can be determined as well as an amount of the applied force. In other embodiments, force sensing of the force applied by the deformation may be accomplished by incorporating localized measurements of strain or other force sensor technologies. In FIG. 3, the deformation of the touch screen has not yet caused the top of the deformation sensing layer 202 to contact the crash pad 204. Thus, the deformation remains linear with respect to applied force and the deformation sensing layer 202 reports no force exerted by the crash pad on the touch screen. If there is a compressible material in the deformation sensing layer instead of air, force may be exerted by the crash pad even if there is no direct contact.

Figure 4:
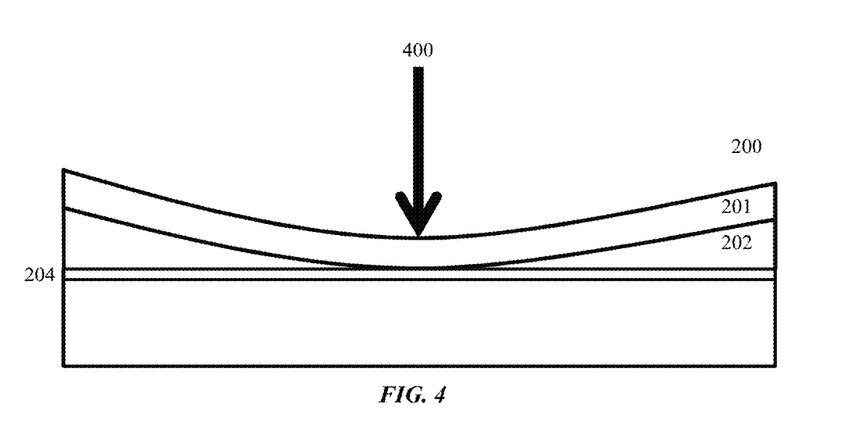
FIG. 4 shows an example of a cross-section of a force-sensing touch screen device when a larger force is applied to the screen of the device.

FIG. 4 shows an example of a cross-section of touch screen device 200 when a force 400, greater than force 300, is applied to the touch screen device. Force 400 is sufficiently great to cause the touch screen to deform and contact crash pad 204. At this point, the distance 203 (not shown) has become zero. Further force will create limited additional deformation from the crash pad 204 deforming. While this figure illustrates a flat crash pad, the crash pad is not required to be flat. In embodiments in which the crash pad is irregular, there may be additional deformation if the screen is contacting the crash pad at a point not directly under the location of the applied force (e.g., due to a portion of the crash pad protruding upwards). Additionally, the point of contact may not be directly under the applied force even if the crash pad is flat. For example, if force is applied away from the center of the touch screen, deflection may be greater towards the center than directly under the force, resulting in a point of contact shifted towards the center of the display.

Additionally, when the touch screen contacts crash pad 204, counter-force will be applied by the crash pad to the screen, nearly stopping the deformation and resulting in the deformation of the touch screen further becoming non-linear with respect to the applied force. At this point, the deflection of the touch screen will not be linear with respect to the user applied force. For example, doubled force applied will not double deflection, but instead only produce a small additional deflection. The crash pad 204 measures the force applied by the touch screen to the crash pad, which is equal in magnitude to the force exerted by the crash pad on the touch screen.

Although the deflection of the touch screen is not linear with respect to the force applied by the user, as long as the crash pad keeps the total deformation small compared to the thickness of the glass, it will remain linear with respect to all of the forces applied (i.e., the sum of the force applied by the user and the counter-force applied by the crash pad.) Thus the actual deformation of the touch screen glass will be the sum of the deformation produced by the crash pad force on the touch screen and the deformation produced by the force applied to the touch screen by the user.

Figure 5:
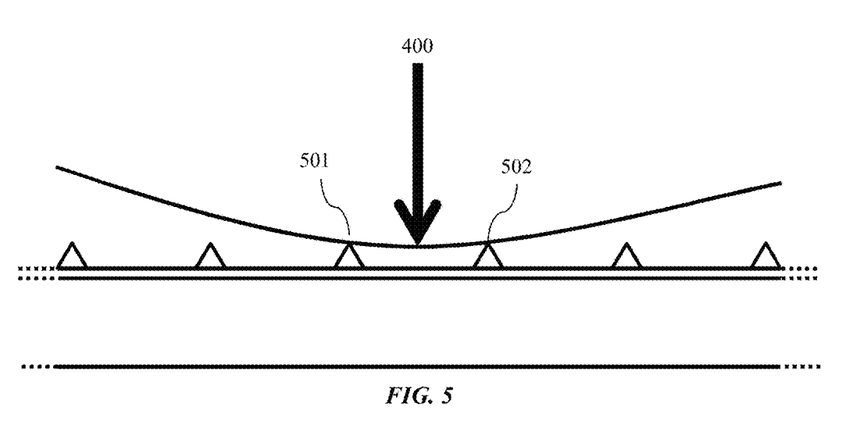
FIG. 5 shows a detail of the cross-section of the touch screen device when force is being applied and the bottom layer is irregular.

FIG. 5 shows a detail of the cross-section of touch screen device 200 when force 400 is being applied. In this detail, an embodiment of the disclosure in which the crash pad 204 is irregular is illustrated. In this embodiment, because the crash pad is not flat, the touch screen deforms and first contacts the crash pad at one or more points such as points 501 and 502. These points are not directly below the point at which the force is applied. In such embodiments, this may result in both a non-linear relationship between force applied and deformation of the glass, and an incorrect location of the point at which force is detected due to the early contact with the protrusion.

Figure 6:
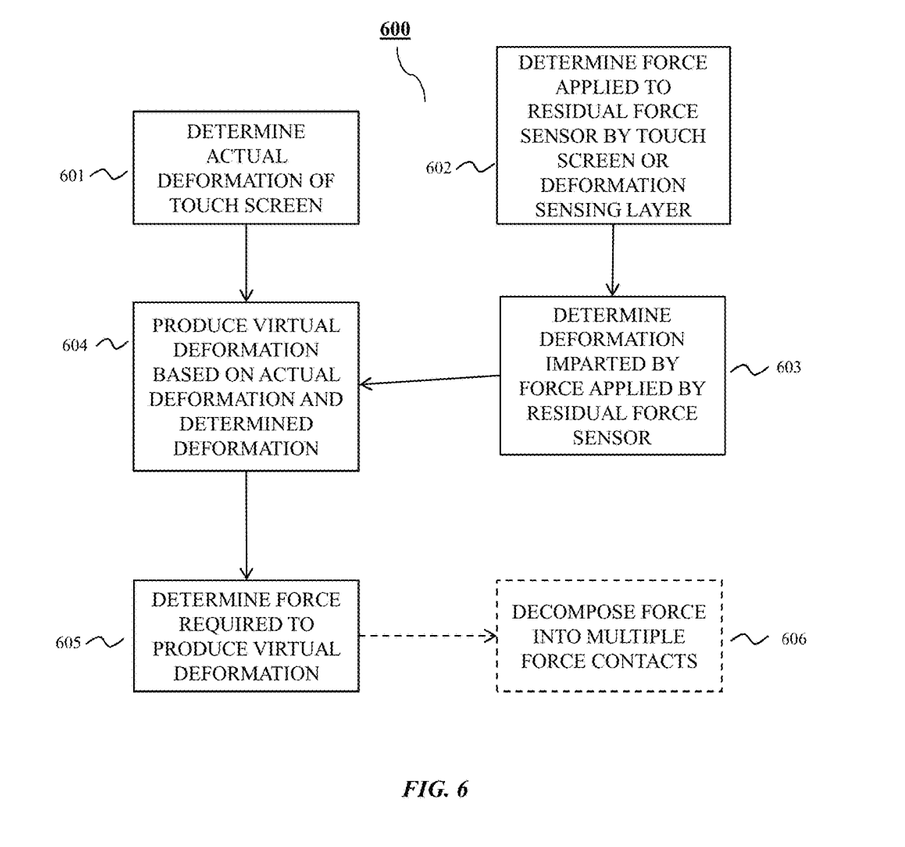
FIG. 6 illustrates a method according to some embodiments of the present disclosure.

FIG. 6 illustrates a method 600 according to some embodiments of the present disclosure. In step 601, a deformation of the touch screen is detected. In step 602, a force applied by the touch screen to the residual force sensing layer (and vice-versa) is detected. In step 603, a model of deformation based on applied force is used to calculate the portion of the measured deformation that is due to the counter-force exerted by the crash pad on the touch screen. In step 604, the deformation due to the force exerted by the crash pad on the touch screen is subtracted from the measured deformation to produce a virtual deformation, which represents the deformation that would have been experienced had the crash pad not been contacted by the touch screen. In step 605, the virtual deformation is used to calculate the external force applied to the touch screen. In some embodiments, an additional step 606, may be performed in which the calculated applied force is separated into summed components from multiple individual forces (e.g., forces applied by multiple fingertips). In these embodiments, touch contact information may be incorporated in order to determine the location of multiple touches on the screen, and that data (combined with force location data) may be used to determine the individual location and magnitude of the multiple individual forces. These steps will now be described in further detail.

In the embodiments of the present disclosure described in FIG. 6, a deformation sensing layer is incorporated. This deformation sensing layer may be a layer used for detecting front-side force, as in existing force-sensitive touch displays. As described above, this sensor may operate by sensing capacitance, strain, or other metrics. In some embodiments, this sensor is a single continuous sensing layer with multiple sensed points. In other embodiments, this sensor is comprised of multiple individual sensor elements. In some further embodiments, each individual sensor element measures local deformation using strain gauges. In step 601, this deformation sensing layer experiences a force. This force generates a deformation which is measured. This measurement may be further processed. In some embodiments, the deformation generates a variation in capacitance which is treated as a map (i.e., a three-dimensional measurement in which two dimensions represent the location of the measured variable on a plane in space and the third dimension represents the intensity of the measured variable) and the map is further processed to estimate the deformation. Step 601 thus outputs a map showing measured deformation of the touch screen.

In step 602, a force applied to the crash pad by the touch screen is determined. For instance, the crash pad may sense capacitance across the crash pad as the capacitance varies with the compression of the crash pad due to force applied perpendicular to the plane of the crash pad. In other embodiments, the crash pad may incorporate some other form of force sensor (e.g., a strain gauge) in order to measure the force applied to the crash pad by the touch screen. This force applied by the touch screen to the crash pad is equal to the force applied by the crash pad to the touch screen. This measurement may be further processed as follows. In some embodiments, the force applied to the crash pad is measured in multiple locations and may be represented as a map (i.e., a three-dimensional measurement in which two dimensions represent the location of the measured variable on a plane in space and the third dimension represents the intensity of the measured variable). In other embodiments, each individual measured point is processed separately. Step 602 thus outputs data, such as a map or collection of measurements, regarding force exerted by the touch screen on the crash pad, and vice versa.

In step 603, a model of deformation based on applied force is used to calculate the portion of the measured deformation that is due to the force exerted by the crash pad on the touch screen (and vice versa). The measured force on the crash pad from the touch screen is equal to the force on the touch screen from the crash pad. Using the model of deformation based on applied force, and the measured force on the crash pad, a deformation due to the crash pad force can be estimated. In some embodiments, the deformation may be generated as a map (i.e., the deformation due to forces at multiple crash pad locations). Step 603 thus outputs a map or collection of measurements of deformation expected due to the force exerted on the crash pad by the touch screen.

In step 604, the expected deformation due to the force exerted by the crash pad on the touch screen is subtracted from the measured deformation to produce a virtual deformation, which represents the deformation that would have been experienced had the touch screen not contacted the crash pad. The measured deformation is the sum of the deformation due to the force applied to the touch screen externally (e.g., from one or more fingertips) and the force applied to the touch screen by the crash pad. Because the deflection from the external forces and the deflection from the force applied by the crash pad sum linearly, the deformation due to the force applied externally may be recovered (e.g., by subtracting the expected deformation from the measured deformation.) Step 604 thus outputs a map or collection of points of virtual deformations that would have been produced by the externally applied force, absent the presence of the crash pad or other interfering structure.

In step 605, the virtual deformation or map of virtual deformations are used to calculate the external force applied to the touch screen. Since the virtual deflection is designed to be linear with respect to the external forces, standard techniques for linear systems such as a matched filter, a pre-whitened matched filter, or a Kalman filter, can be used to determine the external forces that would produce the virtual deformation. A linear model of deformation due to applied force may be used to calculate the force required to produce the calculated virtual deformation, similarly to how these techniques are employed to determine the force required to produce a measured deformation as described in U.S. patent application Ser. No. 14/776,610, incorporated herein in its entirety. Step 605 thus outputs a calculation of the actual force applied to the touch screen, which has been corrected to remove non-linearities due to internal obstruction of deformation.

In some embodiments, additional step 606 is performed, in which the calculated applied force is separated into summed components from multiple individual forces (e.g., forces applied by multiple fingertips). After application of steps 601-605, the response of the touch screen to force is substantially linear, as the non-linearities due to internal obstructions have been corrected for. As a result, according to the superposition principle, the total deflection on the touch screen after force restoration is equal to the sum of the deflections due to individual applied forces. Thus, in step 606, multiple individual forces may be determined from the total reconstructed deflection. In some embodiments, touch contact data can be used to determine centroids of locations at which force may have been applied. Based on the centroids of locations for touch contacts, a number and location of applied forces can be estimated. Using this information regarding the number and location of applied forces, a system of linear equations formed based on the virtual deformation and the location of the applied forces can be solved to determine the magnitudes of the individual applied forces. Thus, optional step 606 outputs a set of locations and magnitudes of individual forces applied to the touch screen. In other embodiments, the calculation of external force during step 605 also produces this set of locations and magnitudes of individual forces applied to the touch screen.

Figure 7A:
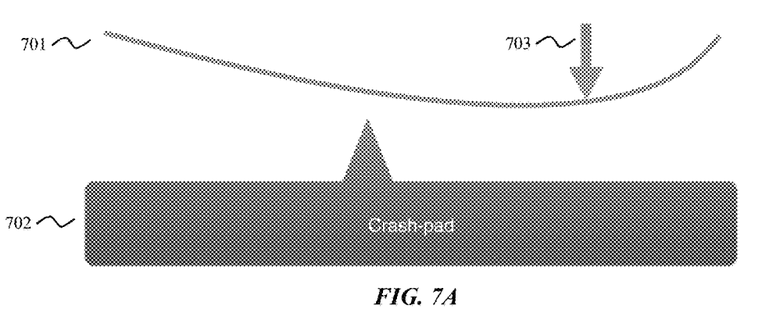
FIGS. 7A and 7B illustrate a crash pad that is not flat and the effects of those irregularities on the deformation of the touch screen.
Figure 7B:
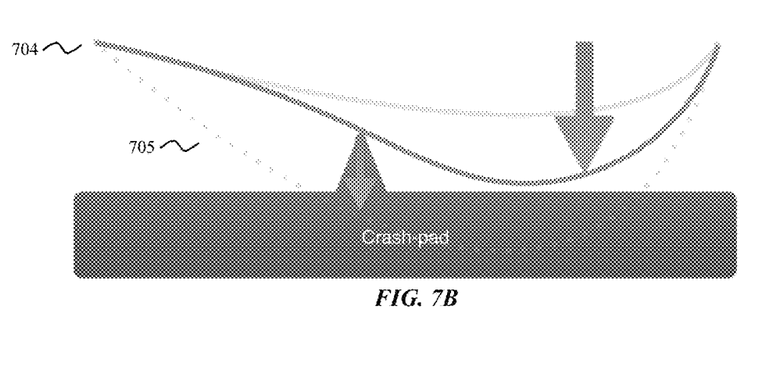
Figure 8:
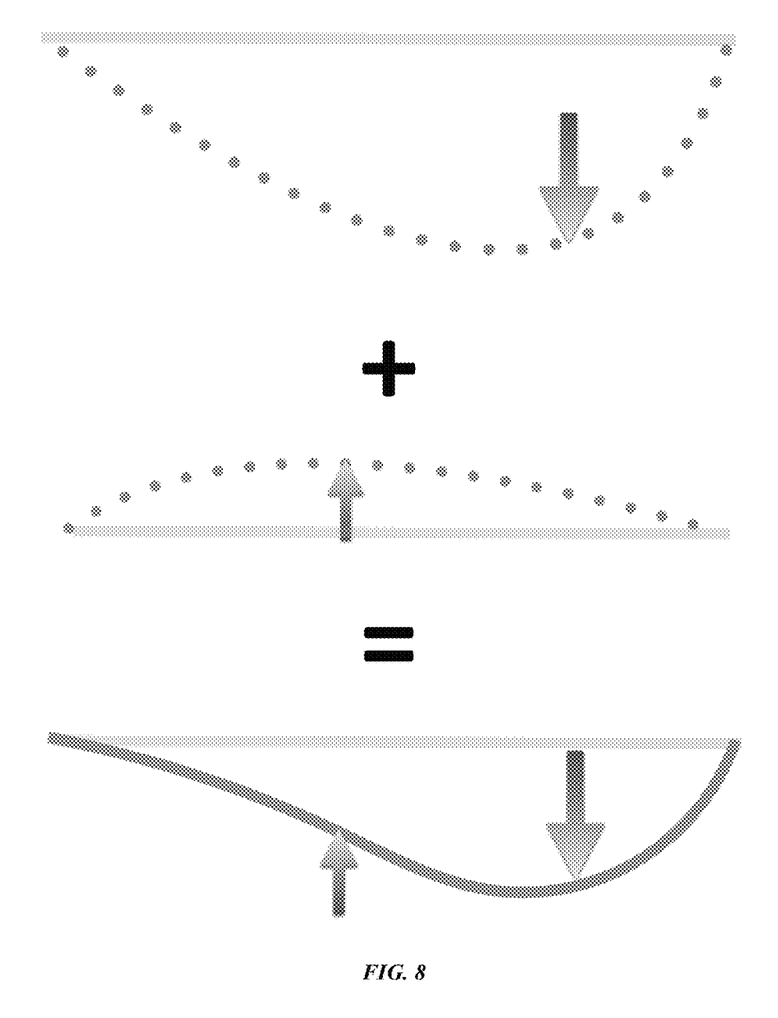
FIG. 8 illustrates the linear combination of deformations to produce the actual deformation.

While the crash pad in earlier figures, such as FIG. 4, was flat, the crash pad may exhibit irregularities. For example, FIGS. 7A and 7B illustrate a crash pad with a large protrusion. FIG. 7 also illustrates the effects of irregularities of the crash pad on the deformation of the touch screen. FIG. 7A shows the deformation of the touch screen 701 when the deformation is not sufficient to engage the crash pad 702. Force 703 is the force applied externally. FIG. 7B illustrates the actual deformation 704 of the touch screen 701 after engaging the crash pad 702, which is different in both magnitude and shape from what the deformation would have been if the crash pad were not present. Virtual deformation 705 represents the deformation that would have occurred if the crash pad was not present FIG. 8 illustrates the linear combination of deformations to produce the actual deformation. In FIG. 8, deformation 801 represents the virtual deformation due to externally applied force, deformation 802 represents the virtual deformation due to the forces applied to the touch screen by the crash pad, and deformation 803 represents the actual deformation due to the combined forces. As can be seen from FIG. 8, deformation 803 is the result of a linear combination of deformation 801 and deformation 802.

Figure 9A:
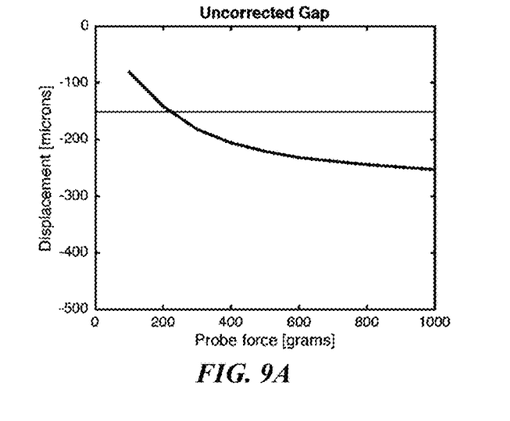
FIGS. 9A-9C illustrate results from testing the present disclosure on experimental hardware.
Figure 9B:
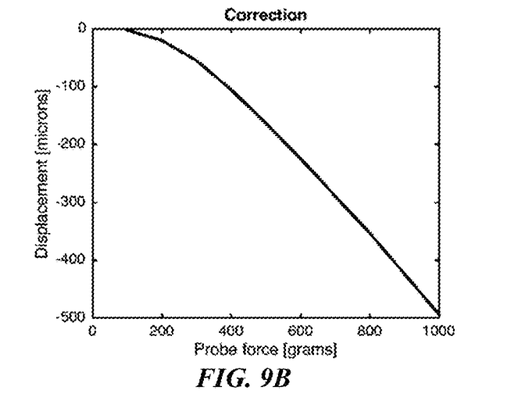
Figure 9C:
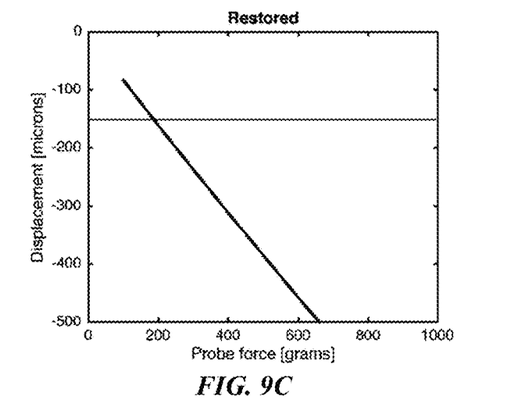

FIGS. 9A thru 9C illustrate experimental results from testing the described method. In FIG. 9A, the displacement of the touchscreen as measured at an individual location versus the amount of force applied to a test article is graphed. This graph shows that the displacement is non-linear with respect to applied force. In FIG. 9B, the calculated correction—i.e., the expected deformation at that sensor resulting from the crashpad force on the touchscreen due to the amount of force applied to the crashpad—is shown. FIG. 9C illustrates that, after correction is applied, linearity is restored to the force-virtual displacement relationship (i.e., the relationship between force and the combination of the crashpad force and the force based on the actual displacement). By restoration of linearity, advantages such as the ability to separate multiple forces using the principle of superposition can be obtained. For example, once linearity has been restored, algorithms that rely on assumptions of linearity can be used to interpret force applied to the screen, as described in U.S. patent application Ser. No. 14/776,610, incorporated in its entirety earlier in the present disclosure.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of at least one particular implementation in at least one particular environment for at least one particular purpose, those of ordinary skill in the art will recognize that its usefulness is not limited thereto and that the present disclosure may be beneficially implemented in any number of environments for any number of purposes.

What is claimed is:

1. A method for determining a force applied to a force-sensing touch screen device, the method comprising:
    measuring, by a deformation sensing layer of the device, an actual deformation of a touch screen of the device;
    measuring, by a force sensor of the device, a sensed force applied by the touch screen to the force sensor of the device;
    determining, by a processor circuit of the device, an expected deformation expected to be imparted to the touch screen by the sensed force; and
    determining, by the processor circuit, a virtual deformation based on the expected deformation due to the sensed force and the measured actual deformation, wherein the virtual deformation indicates the force applied to the force-sensing touch screen.

2. The method of claim 1, where the deformation sensing layer is compressible and configured to operate as a capacitance sensor, and where measuring the actual deformation comprises measuring capacitance across the compressible deformation sensing layer.

3. The method of claim 1, where measuring the actual deformation of the touch screen comprises using localized measurement of strain.

4. The method of claim 1, where the force sensor further comprises a crash pad below the deformation sensing layer.

5. The method of claim 1, where determining the expected deformation comprises using a model of deformation based on applied force.

6. The method of claim 1, where determining the virtual deformation comprises subtracting the expected deformation from the measured actual deformation.

7. The method of claim 1, further comprising using, by the processor circuit, a linear model of deformation due to applied force to calculate a force required to produce the virtual deformation.

8. A system configured to determine a force applied to a force-sensing touch screen device, comprising:
- a deformation sensing layer configured to measure an actual deformation of a touch screen of the device;
- a force sensor configured to measure a sensed force applied by the touch screen to the force sensor of the device;
- a processor circuit coupled to the deformation sensing layer and the force sensor, and configured to execute instructions causing the processor circuit to:
- determine an expected deformation expected to be imparted to the touch screen by the sensed force; and
- determine a virtual deformation based on the expected deformation due to the sensed force and the measured actual deformation, wherein the virtual deformation indicates the force applied to the force-sensing touch screen.

9. The system of claim 8, where the deformation sensing layer is compressible and configured to operate as a capacitance sensor measuring capacitance across the compressible deformation sensing layer.

10. The system of claim 8, where the deformation sensing layer is configured to measure the actual deformation of the touch screen using localized measurement of strain.

11. The system of claim 8, where the force sensor further comprises a crash pad below the deformation sensing layer.

12. The system of claim 8, where the processor circuit is configured to use a model of deformation based on applied force to calculate the expected deformation.

13. The system of claim 8, where the processor circuit is configured to subtract the expected deformation from the measured actual deformation to produce the virtual deformation.

14. The system of claim 8, where the processor circuit is configured to use a linear model of deformation due to applied force to calculate a force required to produce the virtual deformation.

15. The system of claim 8, where the force-sensing touch screen device comprises a touch sensing display layer, a crash pad, or a combination thereof.

16. A mobile device comprising:
- a deformation sensing layer configured to measure an actual deformation of a touch screen of the device;
- a force sensor configured to measure a sensed force applied by the touch screen to the force sensor of the device;
- a processor circuit coupled to the deformation sensing layer and the force sensor, and configured to execute instructions causing the processor circuit to:
- determine a deformation expected to be imparted to the touch screen by the sensed force; and
- determine a virtual deformation based on the expected deformation due to the sensed force and the measured actual deformation, wherein the virtual deformation indicates the force applied to the force-sensing touch screen.

17. The mobile device of claim 16, where the deformation sensing layer is compressible and configured to operate as a capacitance sensor measuring capacitance across the compressible deformation sensing layer.

18. The mobile device of claim 16, where the deformation sensing layer is configured to measure the actual deformation of the touch screen using localized measurement of strain.

19. The mobile device of claim 16, where the force sensor further comprises a crash pad below the deformation sensing layer.

20. The mobile device of claim 16, where the processor circuit is configured to use a model of deformation based on applied force to calculate the expected deformation.

21. The mobile device of claim 16, where the processor circuit is configured to subtract the expected deformation from the measured actual deformation to produce the virtual deformation.

22. The mobile device of claim 16, where the processor circuit is configured to use a linear model of deformation due to applied force to calculate a force required to produce the virtual deformation.

23. The mobile device of claim 16, where the mobile device comprises a touch sensing display layer, a crash pad, or a combination thereof.

* * * * *